METHOD OF MAKING LAMINATED MAGNETIC CORES

Filed March 21, 1946 3 Sheets-Sheet 1

Inventor:
Gareth G. Somerville,
by Ernest C. Britton
His Attorney.

April 10, 1951 G. G. SOMERVILLE 2,548,628

METHOD OF MAKING LAMINATED MAGNETIC CORES

Filed March 21, 1946 3 Sheets-Sheet 2

Inventor:
Gareth G. Somerville,
by Ernest C. Britton
His Attorney.

April 10, 1951 G. G. SOMERVILLE 2,548,628

METHOD OF MAKING LAMINATED MAGNETIC CORES

Filed March 21, 1946 3 Sheets-Sheet 3

Inventor:
Gareth G. Somerville,
by Ernest C. Britton
His Attorney.

Patented Apr. 10, 1951

2,548,628

UNITED STATES PATENT OFFICE 2,548,628

METHOD OF MAKING LAMINATED MAGNETIC CORES

Gareth G. Somerville, Pittsfield, Mass., assignor to General Electric Company, a corporation of New York Application March 21, 1946, Serial No. 655,961

1 Claim. (Cl. 29—155.61)

This invention relates to electric induction apparatus and more particularly to improvements in hinged magnetic cores for such apparatus.

As here used the term "hinged core" means a core having a single joint which is opened and closed by bending another part of the core, after the core has been annealed, for the purpose of linking the core with a conductive winding, typically a form wound coil. Any desired number of such cores may be linked with the same winding so as to constitute a multiple part core. This is usually done to improve the space factor of the window of the winding.

This invention is characterized by making the core from flatwise bent precut lengths of magnetic strip material which are so assembled as to provide a low reluctance interleaved joint, as distinguished from a butt joint, which joint is preferably at one end of the winding leg of the core.

An object of the invention is to provide a new and improved electric induction apparatus.

Another object of the invention is to provide a new and improved method of assembling an electric induction apparatus.

A further object of the invention is to provide a new and improved magnetic core.

An additional object of the invention is to provide a new and improved method for making a magnetic core.

The invention will be better understood from the following description taken in connection with the accompanying drawing and its scope will be pointed out in the appended claim.

Figure 20:
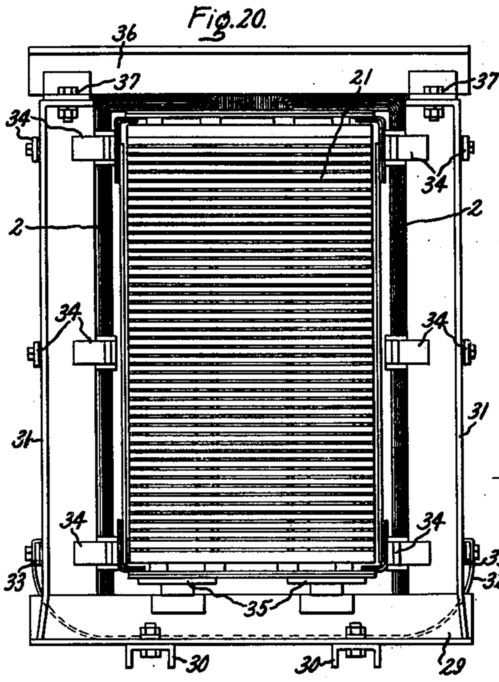
Figure 1:
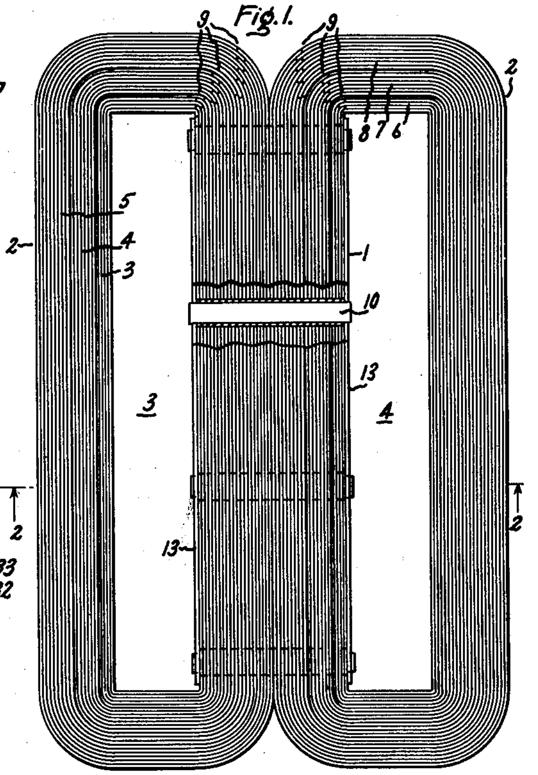
Figure 3:
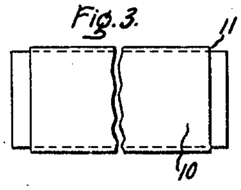
Figure 4:
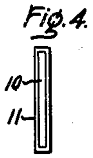
Figure 2:
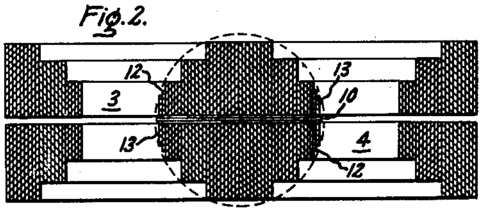
Figure 5:
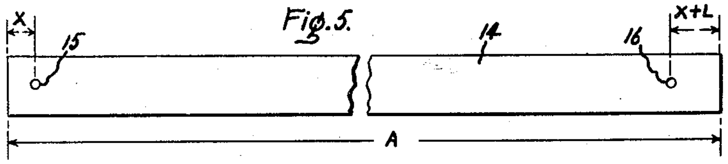
Figures 6, 7, 8:
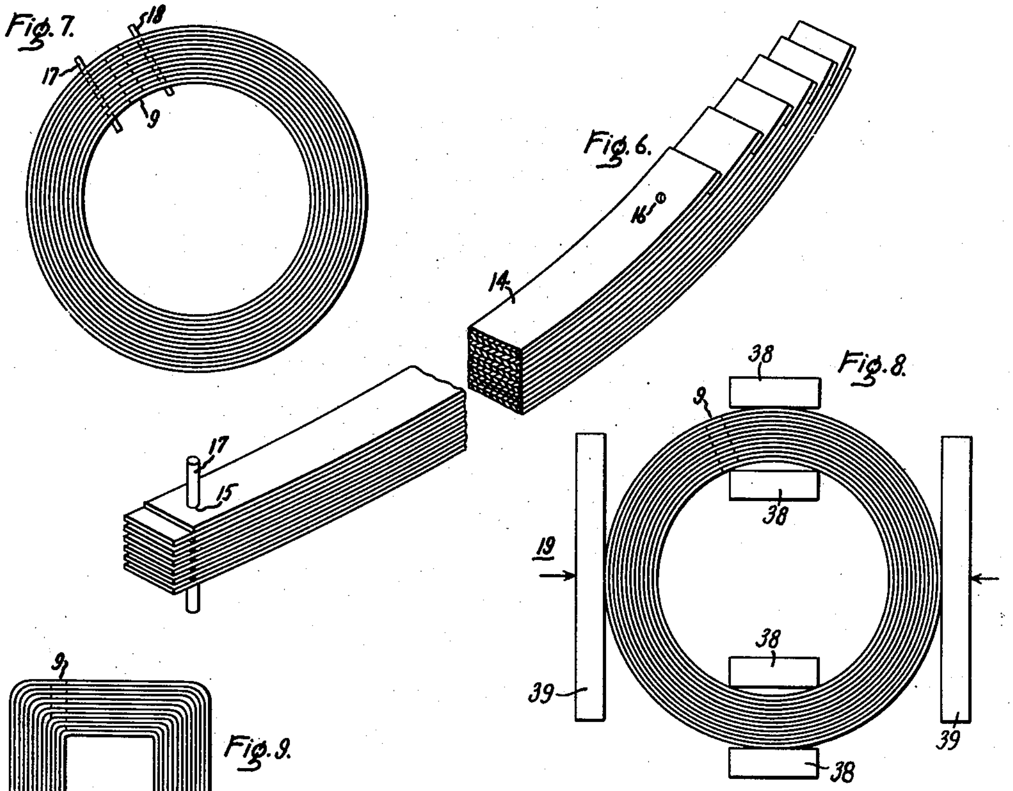
Figure 9:
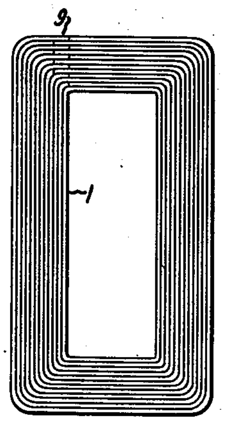
Figure 10:
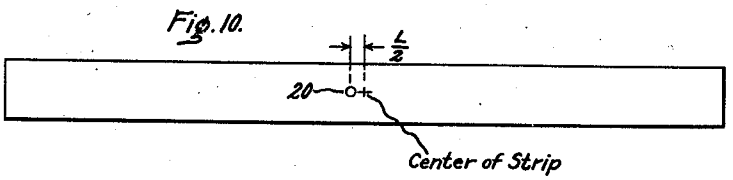
Figure 11:
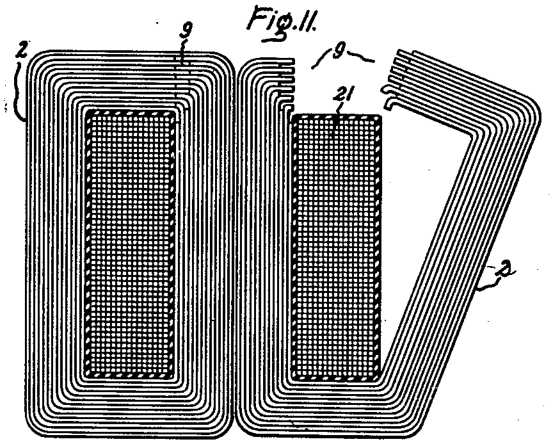
Figure 15:
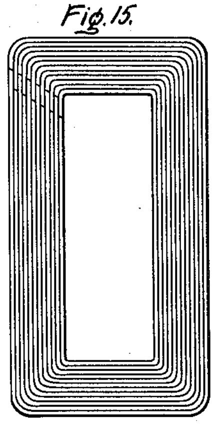
Figure 16:
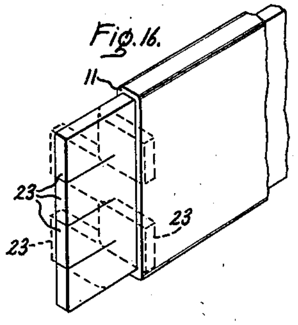
Figure 17:
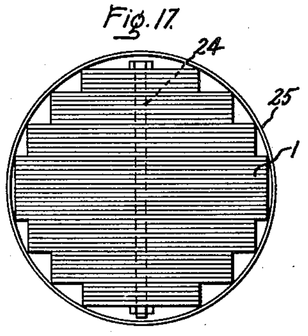
Figure 18:
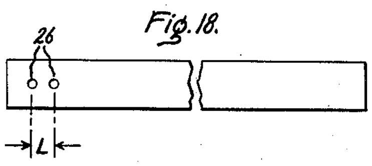
Figure 19:
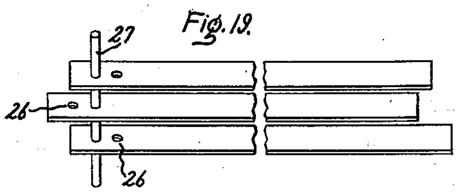

In the drawing, Fig. 1 is a side elevation view of a multi-part core embodying my invention; Fig. 2 is a cross section of the winding leg of the core shown in Fig. 1 taken on line 2—2 thereof; Figs. 3 and 4 are side and end views respectively of the tie strap used for holding together the sections of the core shown in Figs. 1 and 2; Fig. 5 is a plan view of one of the precut strips used in making a core or core section; Fig. 6 is a view of a stack of strips of the type shown in Fig. 5 which are aligned during an intermediate stage in the formation of the core; Fig. 7 shows a further stage in the formation of the core in which the strips have all been bent so as to form a laminated closed loop having butt and lapped joints; Fig. 8 is a view showing the step of shaping the core to the desired configuration; Fig. 9 illustrates a typical configuration of a shaped core; Fig. 10 is a plan view of a modified form of precut strip which can be used in making a core in accordance with my invention; Fig. 11 illustrates a two-section core showing the hinge action when the joint is separated for the purpose of linking the core with a conductive winding; Figs. 12, 13, 14 and 15 are detailed views showing various modified forms of joints; Fig. 16 is a modified form of tie strap; Fig. 17 is a sectional view of the winding leg of a modified form of cruciform core; Fig. 18 shows a modified lamination piece; Fig. 19 shows how pieces of the type shown in Fig. 18 are preliminarily assembled; and Fig. 20 is an elevation view of a completed induction apparatus including the core of my invention having a coil winding mounted on its winding leg and being clamped and supported in a frame assembly.

Referring now to the drawing and more particularly to Fig. 1, the illustrated core is a single-phase distributed type core having a central winding leg 1 and a divided yoke 2. As seen in this figure, it is symmetrical about a vertical center plane which is perpendicular to the paper and the duplicate right- and left-hand halves 3 and 4 each comprise three nested core members 3, 4, 5 and 6, 7, 8, respectively. Actually, as shown in Fig. 2, the core is also symmetrical about a second plane at right angles to the dividing plane referred to in connection with Fig. 1 and which is also perpendicular to the paper in Fig. 2 so that the right- and left-hand halves of the core actually each consist of six core elements, the ones directly in front and in back of the last-mentioned plane being duplicates. As seen in Fig. 1, the core elements each have a single joint 9 which is at the upper end of the straight winding leg in each case. As shown in this figure, these joints appear successively to be staggered instead of being in vertical alignment and this is necessary so that when the core elements are opened up for receiving a conductive winding they will not extend over beyond the dimensions of the coil window.

The six core parts are held firmly together by tie straps 10 which are relatively wide so as to have the necessary area to provide adequate strength and at the same time are relatively thin so that there is comparatively little separation between the front and back core parts. Side and end elevation views of one of these straps are shown by Figs. 3 and 4. Preferably they have shoulders 11. These straps extend slightly beyond the right and left edges of the winding leg 1 and the ends of the straps pass through an opening in a washer 12, which may be made of any suitable material such as pressboard, and an outer steel plate 13 to which the ends of the straps are welded. As will be seen in Fig. 2, there is adequate space between the winding and the right- and left-hand edges of the center part of the core for this weld because the window of the winding is generally circular, as indicated by the dotted circle which surrounds the core leg 1 in Fig. 2. Such a core is usually referred to as a cruciform core because, as shown in Fig. 2, the cross section of its winding leg is generally in the shape of a cross. However, most cruciform cores contain many more steps or core sections of different width.

The construction of each of the six core steps shown in Figs. 1 and 2 is generally the same so that a description of the construction of one of them will suffice as a description of the construction of all of them. A preferred way of making the core is to cut from a long strip of magnetic material of the proper width a plurality of pieces 14 of the general shape shown in Fig. 5. "A" may be the length of the innermost piece or layer or lamination of a core, X is a standard distance between the shear of the cutting machine and a punch on this machine for punching a hole 15 in the strip, and L is the length of the lap which it is desired to have for the overlapping joints. The cutting machine has a second punch for making a hole 16 a distance X+L from the other end of the piece 14. The cutting machine, which may for example be of the type shown in my Patent 2,369,617 which is assigned to the present assignee, is set so as to cut each succeeding strip slightly longer than the preceding strip, that is to say, the dimension A increases in proportion to the thickness of the strip as of course each succeeding overlying layer must be longer than the layer which is surrounds. Preferably the gain is more than is absolutely necessary so as to allow for reasonable manufacturing tolerances or variations in the thickness of the magnetic strip. This gain may be expressed by the formula $2\pi TK$ where T is the thickness of the strip and K is an arbitrary factor slightly greater than one which produces the overgain. This overgain is an inverse function of the length of the outer perimeter of the core, because the larger the core, the less overgain is needed.

When the desired number of pieces have been cut they are stacked alternately reversed with the holes at one end in alignment or registration and a pin 17 is passed through these aligned holes for holding the strips in this relation. The stacked strips are then bent in the proper direction in any suitable manner, as is also indicated in Fig. 6, until the holes at the other end come into substantial registry when a second pin 18 is passed through these holes and the ends of each strip are brought together by urging these pins 17 and 18 toward each other so that, as shown in Fig. 7, the opposite ends of each strip butt against each other and the butt joints thus formed are overlapped in staggered relation.

The core is then placed in an arbor or press 19, as shown in Fig. 8, so as to pressure work it into the desired shape which ordinarily is such that the finished core will have a straight winding leg with the joint at one end of this straight winding leg. The arbor or press 19 is shown as comprising rigid rectangular shaping blocks 38 placed inside and outside the core loop and in contact therewith at diametrically opposite parts of the core loop. The core joint 9 is located at the end of one of the blocks 38. Inwardly directed pressure or compressing force is applied to the core loop by movable pressure plates 39 which move toward each other along a diameter of the core loop at right angles to the diameter on which the shaping blocks 38 are located. Typically, the core is rectangular in shape with the joint 9 at one corner. The core is then annealed in its finished shape so as to remove all strains and set the material in this shape. After the anneal the core can be removed from all restraint and it will stay in its formed position which is typically shown in Fig. 9. It will be noted that the corners are relatively square and this is due to the fact that the excess material which results from the overindexing or overgain in cutting the pieces is forced into the corners.

It is not essential to punch two holes in each lamination or piece and, as shown in Fig. 10, the core can also be made by punching a single hole 20 near the middle of each piece, the displacement from the middle being a function of the desired overlap in the joint. In making a core in this manner the pieces are aligned on a pin which is passed through the holes and alternate pieces are reversed and the stacked strip with the alternately reversed pieces is then bent into a closed loop and the opposite ends of each piece are brought into abutting relation so as to form the butt overlapped joint. This procedure, however, is ordinarily not as satisfactory as the two-hole technique because it is not as easy to form the core joint when the pieces have been cut with an excess overgain.

The core is linked with a coil 21, as shown in Fig. 11, where the core consists of two parts back to back so as to produce a simplified structure of the general type shown in Figs. 1 and 2 and it is seen that the core parts hinge or flex near the bottom so as to permit the joints to be opened so that a coil can be slid over the central winding leg. After the coil is in place, the first few laminations next to the coil are fitted together with care and then the remaining core parts are pushed into their proper relation. It has been found that the joints fit together very nicely and snugly. These joints can be held tightly together by wrapping a clamping band tightly around the entire structure or clamping in the usual manner.

Figure 12:
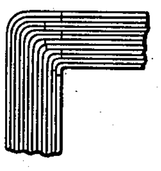

It is not essential that the butt joints be only one layer thick and they may be any desired number of layers thick and, as shown in Fig. 12, the butt joints are two layers thick and these joints are then of course staggered as in the preceding figures.

Figure 13:
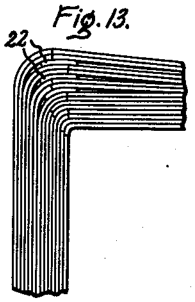

By reason of the butt joints, which are aligned in the odd-numbered layers or groups of layers, the magnetic material adjacent these butt joints is overworked because of the fringing of the flux so that the core losses are somewhat higher at the joint. This condition may be improved by inserting padding strips 22 which bridge the butt joints in adjacent layers, as is shown in Fig. 13. This, however, results in a thickening or overbuilding of the core at the joint.

Figure 14:
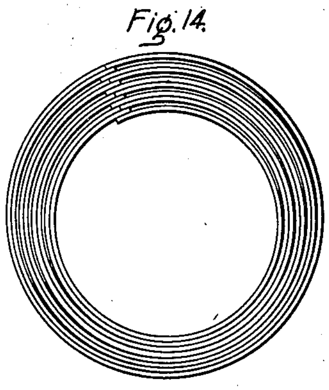

Another form of joint which may also be used is shown in Fig. 14 in which the even-numbered layers, or groups of layers for example, have butt joints as in Figs. 7 and 12, while the ends of the odd-numbered layers or groups of layers overlap each other in each such layer. This produces a core having 100 per cent cross section at the joint with a 1½ build at the joint, that is to say, it is 50 per cent thicker at the joint than it is elsewhere in the core.

Another form of joint which may be used is a so-called scarfed joint which differs from the conventional butt and lapped joint in that the successive butts and overlaps progress diagonally across the core instead of directly or perpendicularly across it. Such a joint is shown in Fig. 15. In this manner the two butt joints on opposite sides of an intermediate strip or group of strips are not in alignment so that the maximum flux density in the core is reduced as the fringing action of the flux at the gaps will occur at different places in the intermediate strip.

A modification of the form of tie strap shown in Figs. 3 and 4 is illustrated in Fig. 16. In this modified tie strap, the ends beyond the shoulder 11 are slit or split into a plurality of tongue-like portions 23 which are sharply bent, alternately, in opposite directions so as to hold the winding leg portion of the core together.

It is not necessary that the core be held together by tie straps and in Fig. 17 there is shown in cross section the winding leg of a cruciform core in which the various steps extend the full width of the core and are not divided into duplicate front and back portions as in Figs. 1 and 2. The parts of the winding leg may be held together by conventional clamping bolts 24. In this case, the holes for the bolts are punched in the individual lamination pieces as they are made. The winding leg shown in Fig. 17 may also be held together by nonmetallic straps such as laminated fibre straps 25 which are wrapped around the winding leg and over which the coil cylinder is slit.

Another way of punching the lamination pieces is shown in Fig. 18 in which two holes 26, separated by the distance (L), are punched the same distance from one end of each lamination piece. These pieces may be preliminarily assembled as shown in Fig. 19 in which a pin 27 is passed through the outermost holes, in say the odd numbered lamination pieces, and through the innermost holes 26 in the even numbered lamination pieces. In this manner, the staggered ends are produced so that when the assembled laminations are bent around to form a closed loop, the ends can be fitted together to form the butt and overlapped joint.

A view of an assembled electric induction apparatus embodying the invention is shown in Fig. 20. In this figure the core is cradled in a frame comprising angle iron members 29 which are held together by cross members 30 which are bolted thereto. Upright angle iron members 31 serve to clamp the yoke portions 2 of the core and strap members 32 which are fastened to cross pieces 33 attached to the members 31 serve to support the weight of the core. These strap members 32 extend around underneath the core and are in tension and conform to the rounded shape of the bottom of the core. Additional cross members 34 on both the inside and outside of the upright members 31 serve to support the yoke members 2 of the core at both its inside and outside portions.

The coil 21 is supported by members 35 which are fastened to the bottom members 29 and which may be adjusted in any suitable manner so as to position the coil 21 properly. The top part of the core is clamped between members 36 which are bolted as at 37 to the upright members 31.

While there have been shown and described particular embodiments of this invention, it will be obvious to those skilled in the art that various changes and modifications can be made therein without departing from the invention and, therefore, it is aimed in the appended claim to cover all such changes and modifications as fall within the true spirit and scope of the invention.

What I claim as new and desire to secure by Letters Patent of the United States is:

The method of making a laminated magnetic core including the steps of cutting a plurality of uniformly different length pieces from a long strip of magnetic material, punching a hole in each piece, flatwise stacking said pieces on top of each other in the order of their length with said holes in registration, inserting a pin in said registering holes, flatwise bending said stacked strips to form a closed circular loop core with one joint in which each piece forms a complete separate layer of said loop, placing rigid rectangular shaping blocks in contact with the inside and outside of said circular core loop at diametrically opposite locations thereon, said joint being adjacent to but to one side of one pair of said blocks, said pieces being longer than necessary to wrap around the next innermost piece, applying compressive force to said circular core loop along a diameter thereof which is at right angles to the diameter upon which said shaping blocks are located by means of parallel pressure plates movable toward each other on opposite sides of said circular core loop, said circular core loop being thus reshaped entirely by compressive forces directed inwardly against its outer surface into a generally rectangular shape and being clamped between the ends of said blocks and the surfaces of said movable plates, the excess material in said pieces resulting from their being longer than necessary to wrap around the next innermost piece being forced into the corners whereby said corners are more squared than rounded, and strain relief annealing said core.

GARETH G. SOMERVILLE.

REFERENCES CITED

The following references are of record in the file of this patent:

UNITED STATES PATENTS

| Number | Name | Date |
|---|---|---|
| 523,572 | Hassler | July 24, 1894 |
| 1,285,996 | Hensley | Nov. 26, 1918 |
| 1,457,619 | Cohen | June 5, 1923 |
| 1,933,140 | Gakle | Oct. 31, 1933 |
| 1,935,426 | Acly | Nov. 14, 1933 |
| 2,260,398 | Otte | Oct. 28, 1941 |
| 2,290,680 | Franz | July 21, 1942 |
| 2,305,649 | Vienneau | Dec. 22, 1942 |
| 2,305,650 | Vienneau | Dec. 22, 1942 |
| 2,313,306 | Wiegand | Mar. 9, 1943 |
| 2,376,613 | Nelson | May 22, 1945 |
| 2,380,300 | Gaston | July 10, 1945 |
| 2,456,457 | Somerville | Dec. 14, 1948 |
| 2,456,458 | Somerville | Dec. 14, 1948 |
| 2,467,867 | Somerville | Apr. 19, 1949 |
| 2,478,030 | Vienneau | Aug. 2, 1949 |

FOREIGN PATENTS

| Number | Country | Date |
|---|---|---|
| 106,986 | Great Britain | of 1917 |